Nov. 12, 1963 D. A. DRAKE 3,110,439

TAPE FEEDING MECHANISM

Filed April 25, 1960 3 Sheets-Sheet 1

INVENTOR.
DERRELL A. DRAKE
BY Whittemore Hulbert & Belknap
ATTORNEYS.

Nov. 12, 1963 D. A. DRAKE 3,110,439

TAPE FEEDING MECHANISM

Filed April 25, 1960 3 Sheets-Sheet 2

INVENTOR.
DERRELL A. DRAKE
BY Whittemore
Hulbert & Belknap
ATTORNEYS.

INVENTOR.
DERRELL A. DRAKE
BY Whittemore
Hulbert & Belknap
ATTORNEYS.

United States Patent Office 3,110,439
Patented Nov. 12, 1963

3,110,439

TAPE FEEDING MECHANISM

Derrell A. Drake, St. Clair Shores, Mich., assignor to Holley Carburetor Company, Van Dyke, Mich., a corporation of Michigan Filed Apr. 25, 1960, Ser. No. 24,531
16 Claims. (Cl. 234—50)

The present invention relates generally to tape feeding mechanism and refers more specifically to means for reindexing tape being perforated between periods of perforation thereof.

With high speed tape perforators it is impractical to continually pass tape through rotating punch rollers thereof since relatively large periods during which no perforation of the tape is required are common and since the transcribing mechanism for transcribing the information represented by the perforations in the tape operates at a relatively slow speed. It is therefore necessary to intermittently operate the punch rollers of high speed tape perforators.

Intermittent operation of the punch rollers causes the tape being punched thereby to be positioned so that the spacing between the characters punched therein will not be uniform between the last character of one group of information, after which the rollers are stopped and the first character of a subsequent group of information after again starting the rollers due to the impossibility of suddenly stopping the tape due to inertial forces and the time required to withdraw a punch from the tape.

The usual tape utilization devices however require uniform spacing between the characters punched in the tape. Therefore some means is required for reindexing the tape after the punch rollers have been stopped so that a standard spacing is maintained between the last character in a group of information and the first character in a subsequent group of information punched in the tape.

It is therefore one of the objects of the present invention to provide tape feeding mechanism including means for reindexing tape being perforated between periods of perforation thereof.

Another object is to provide tape feeding mechanism including adjustable means for reindexing tape being perforated between adjacent character perforations.

More specifically it is an object to provide tape feeding mechanism including perforating means, guide means through which a tape being perforated is adapted to slide which means is movable between a pair of stops during operation of the perforating means and means biasing the guide means into contact with one of said stops on stopping of the perforating means.

Another object is to provide tape feeding mechanism as set forth above and further including take-up or pinch rollers operable to assist in advancing the tape being perforated through the perforating means.

Another object is to provide tape feeding mechanism as set forth above wherein said stops are adjustable.

Still more specifically it is an object to provide tape feeding mechanism including a guide lever pivotally mounted for movement between a pair of adjustable stops, shoe means for urging a tape being perforated against the guide whereby as the tape is passed through the guide for perforation by rotating punch rollers the guide is moved into contact with one of the stops, and bias means operable to return the guide to a position against the other of said stops on stopping of the punch rollers.

Still more specifically it is an object to provide tape feeding mechanism including guide means for a tape to be perforated which guide means is slidable between a pair of stops, tension bar means for urging a tape to be perforated by punch rollers against said guide means whereby the guide means is caused to abut one of said stops when the punch rollers are rotated, and adjustable biasing means for biasing the guide means into contact with the other of said stops on stopping of the punch rollers.

Another object is to provide tape feeding mechanism as set forth above wherein said one stop means and said bias means are combined.

Another object is to provide tape feeding mechanism as set forth above which is simple in structure, economical to manufacture and efficient in use.

Other objects and features of the invention will become apparent as the description proceeds, especially when taken in conjunction with the accompanying drawings, illustrating a preferred embodiment of the invention, wherein.

With reference to the figures a specific embodiment of the invention will now be disclosed.

Figures 1, 2:
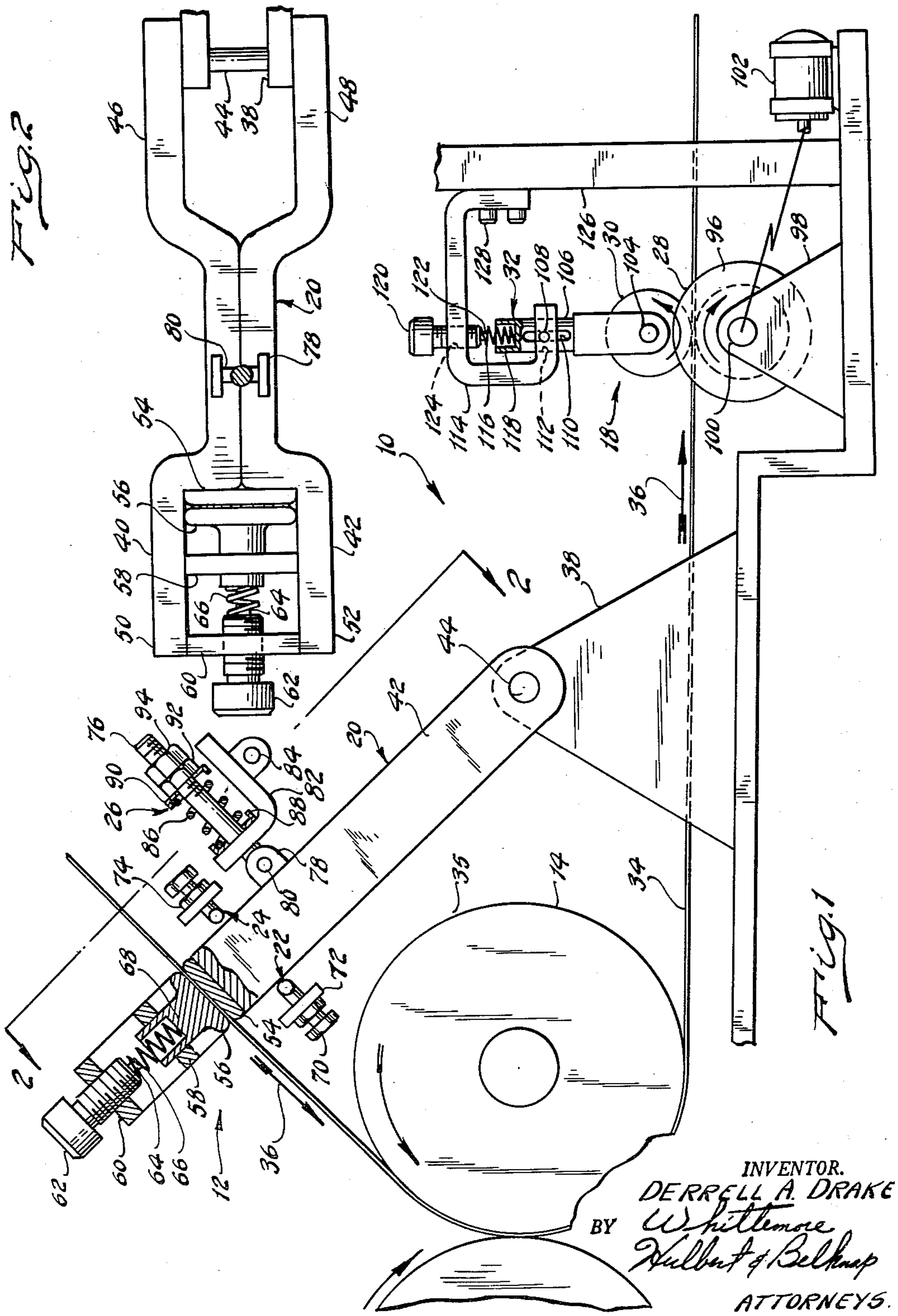
FIGURE 1 is a partially broken away elevational view of tape feeding mechanism according to the invention.
FIGURE 2 is a view of a portion of the tape feeding mechanism of the invention as shown in FIGURE 1 taken in the direction 2—2 in FIGURE 1.

The tape feed mechanism 10 of the invention shown in FIGURE 1 comprises reindexing mechanism generally indicated 12, punch rollers 14 and 16 and pinch roller mechanism generally indicated 18. The reindexing mechanism includes the guide means 20, adjustable stops 22 and 24 and bias mechanism 26. Pinch roller mechanism 18 includes pinch rollers 28 and 30 and pinch roller biasing means 32.

In operation tape 34 is passed through guide means 20, around punch roller 14 and between pinch rollers 28 and 30. During perforating thereof the tape is moved in the direction of arrows 36. With the tape in position as shown in FIGURE 1, as the punch rollers are driven guide means 20 is caused to be positioned against abutment 22 in opposition to the bias means 26 as will later be seen.

When the drive of the punch rollers ceases due to nonreception of signals indicating characters to be punched in the tape 34 the tape 34 held by guide means 20 is repositioned by reindexing means 12 as guide means 20 moves into position against abutment 24 due to bias means 26 which is sufficient to overcome the tendency of the pinch roller mechanism 18 to continue to feed the tape 34 over the punch roller 14. Bias means 26 it will be understood is not sufficiently strong to hold guide means 20 against abutment 24 in opposition to both driving of the punch rollers 14 and 16 and pinch rollers 28 and 30.

More specifically the guide means of the reindexing mechanism 12 comprises a mounting bracket 38 to which lever arms 40 and 42 as best shown in FIGURE 2 are pivotally secured by means of pin 44. Lever arms 40 and 42 are offset at ends 46 and 48 for mounting on bracket 38 and at ends 50 and 52 to receive a guide member 54 against which tape 34 is biased by shoe 56 as it passes through guide means 20 as shown in FIGURE 1.

The ends 50 and 52 of lever arms 40 and 42 also have cross members 58 and 60 extending therebetween. Cross member 58 serves as a sleeve to guide shoe 56 in movement longitudinally of the lever arms. Cross member 60 as shown supports an adjusting screw 62 therein having a projection 64 on the end thereof over which spring 66 is sleeved.

Spring 66 which is sleeved over the projection 64 on screw 62 at one end is seated in recess 68 in the end of shoe 56 at the other end. Spring 66 is operable to bias shoe 56 toward guide member 54 to provide sufficient frictional resistance between the guide member 54 and the tape 34 to permit slipping of the tape between shoe 56 and guide member 54 when both the punch rollers and the pinch rollers are driven but to securely hold the tape between the shoe 56 and guide member 54 when only the pinch rollers are driven.

The guide means 12 further includes the adjustable stops 22 and 24. Stops 22 and 24 are similar and each comprise an adjustable bolt 70 positioned as shown at each side of the pivot arms 40 and 42 to restrict pivotal movement thereof which bolt extends through a fixed support 72 and may be locked in adjusted position by means of a lock nut 74.

As indicated previously the guide means 12 is abutted against stop 22 during driving of both the punch rollers and pinch rollers. When the punch rollers are not driven the guide means 20 is biased against stop 24 by bias means 26 thereby causing reindexing of tape 34 as will be subsequently explained.

Bias means 26 includes bolt 76 pivotally mounted by means of tabs 78 and pin 80 to guide means 20 as shown. Bias means 26 further comprises bracket 82 pivotally secured by means of pin 84 to a fixed surface (not shown) and spring 86 acting between washers 88 and 90 to bias the guide means 20 into contact with abutment 24.

The amount of bias applied to guide means 20 by spring 86 may be varied by adjusting nut 92 on bolt 76. Nut 92 may be locked in position on bolt 76 by a lock nut 94.

Punch rollers 14 and 16 are of the rotary type including means whereby as the tape 34 is passed therebetween transverse rows of perforations are made in the tape at predetermined intervals longitudinally thereof representative of coded characters. Punch rollers 14 and 16 also include means for driving the tape 34, such as radially extending retractable studs 35 engageable either frictionally with tape 34 or with pre-punched perforations in the tape 34, which studs are withdrawn to prevent driving of the tape when no signal representative of a character to be punched is received by the roller actuating mechanism.

In other words the reindexing mechanism of the invention is particularly useful in systems wherein the punch rollers furnish at least part of the driving force for the tape while the punching operation is in progress and wherein the punch rollers do not materially restrict movement of the tape therearound in an opposite direction when no signals representative of characters to be punched in the tape are being received by the punch roller actuating mechanism.

Punch rollers 14 and 16 form no part of the present invention and therefore will not be described further.

Figure 3:
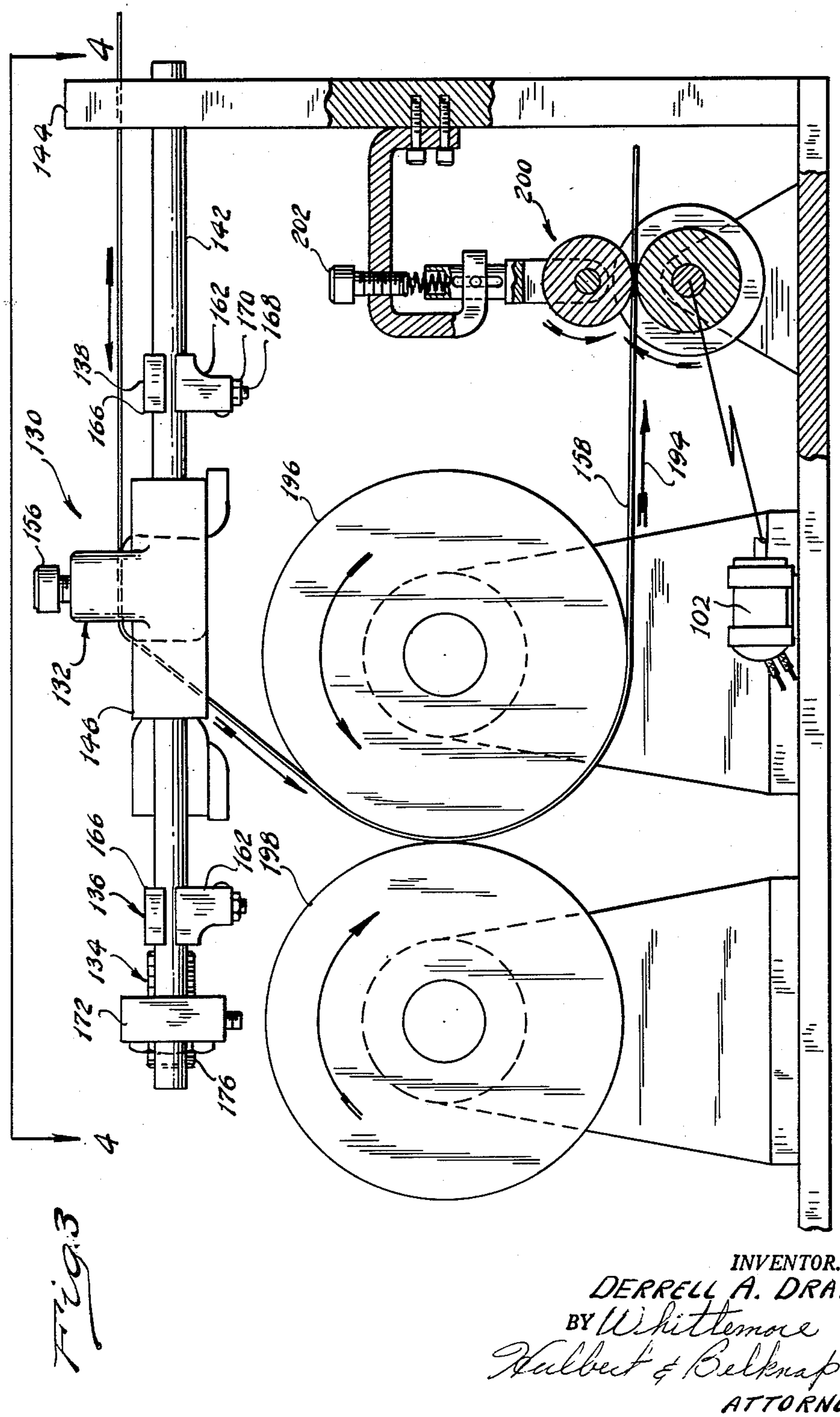
FIGURE 3 is an elevational view of a modified tape feeding mechanism according to the invention.

The pinch roller mechanism 18, as previously indicated, includes the pinch roller 28 having flanges 96 thereon as best shown in FIGURE 3 between which the pinch roller 30 is guided as will be understood. Pinch roller 28 is supported on bracket 98 for rotation with shaft 100 which may be driven by convenient means such as motor 102. Pinch roller 30 as shown is supported for rotation on shaft 104 by means of the bifurcated member 106.

Member 106 is secured by means of the pin 108 and slot arrangement 110 for sliding movement in passage 112 in bracket 114. The member 106 and therefore the pinch roller 30 are biased to urge the tape 34 against the pinch roller 28 by means of spring 116 resting at one end in the recess 118 in the end of member 106. The other end of spring 116 is sleeved over the projection 122 on the end of the adjustable screw 120 which is threadedly secured in a passage 124 through bracket 114 as shown. Bracket 114 may be secured to the fixed surface 126 by suitable means such as screws 128.

The pinch roller mechanism 18 serves to take up any slack in the tape 34 after it passes punch rollers 14 and 16 and aids in the driving of the tape 34 in the direction of arrow 36 as will be understood.

In operation it will be understood that the tape 34 is threaded through the guide means 20 of the reindexing mechanism 12, over punch roller 14 and between pinch rollers 28 and 30 as illustrated in FIGURE 1.

With the pinch rollers in operation and signals representative of characters to be punched being received by the actuating mechanism for the punch rollers 14 and 16 the tape 34 will be caused to be fed in the direction of the arrows 36 at a high rate of speed and perforations representative of signals received by the punch roller actuating mechanism will be punched in tape 34 at spaced intervals along the tape. It will be understood that each transverse line of perforations punched in the tape which are representative of a particular character must be spaced with exactness from the preceding and following transverse line of perforations on the tape so that the information contained on the tape may be transcribed by a relatively slow operating transcribing machine.

Thus it is desirable for the punch rollers to stop driving the tape 34 immediately after the last character of a group of characters is punched in the tape 34. However, as previously explained, due to the inertia of the punch rollers and the time required to withdraw the retractable punches from the tape the tape is driven somewhat beyond the position in which it is required to be to maintain the proper spacing between the last character of one group of signals and the first character of another group of signals. It is therefore necessary to reindex the tape after each group of signals has been received and before the start of the reception of the next group of signals in order to compensate for both the over-drive of the tape after the last punching thereof and the time required to start driving the tape before the next punching operation so that the desired spacing between the last character of the one group and the first character of the next group may be maintained. It will of course be understood that the number of signals in a group may vary.

In accordance with the invention during driving of the tape by the punch rollers 14 and 16 the guide means 20 of the reindexing mechanism 12 is caused to be moved in opposition to the bias exerted thereon by the bias means 26 into position against abutment 22 due to the urging of the tape 34 against guide member 54 by shoe member 56 and the multiple driving of the tape 34 by means of the punch rollers and the pinch rollers.

When the last character of a group has been received and the tape is no longer driven by the punch rollers the guide means of the reindexing mechanism is caused to be moved from its position against abutment 22 into a position where it contacts abutment 24. Since the drive of the tape 34 by means of the pinch rollers alone is not sufficient to overcome the bias means 26 of the reindexing mechanism or sufficient to cause the tape 34 to slide between the shoe 56 and the guide member 54 as is the case when the tape 34 is driven by both the punch rollers and the pinch rollers, the tape will be reindexed by this movement of the guide means to abutment 42.

It will be understood that the exact reindexing of the tape necessary to permit punching the tape in the correct position on the reception of subsequent signals by the punch roller actuating means may be adjusted by means of the adjustable abutments 22 and 24. The amount of reindexing necessary will of course be determined by the distance the tape is driven past the punching position before the punches are retracted and the time required for the punch rollers to initiate driving of the tape after the reception of subsequent signals requiring punching of the tape as determined by frictional engagement of indexing pins with the tape being driven or fitting of the indexing pin carried by the punch rollers into pre-punched indexing perforations in the tape.

In addition the relative biases of the pinch rollers, bias means 26 and the shoe 56 against the guide plate 54 are adjustable to provide the above operation by means of the screw 120, nut 92 and screw 62 respectively, as will be readily understood by those in the art.

Figure 4:
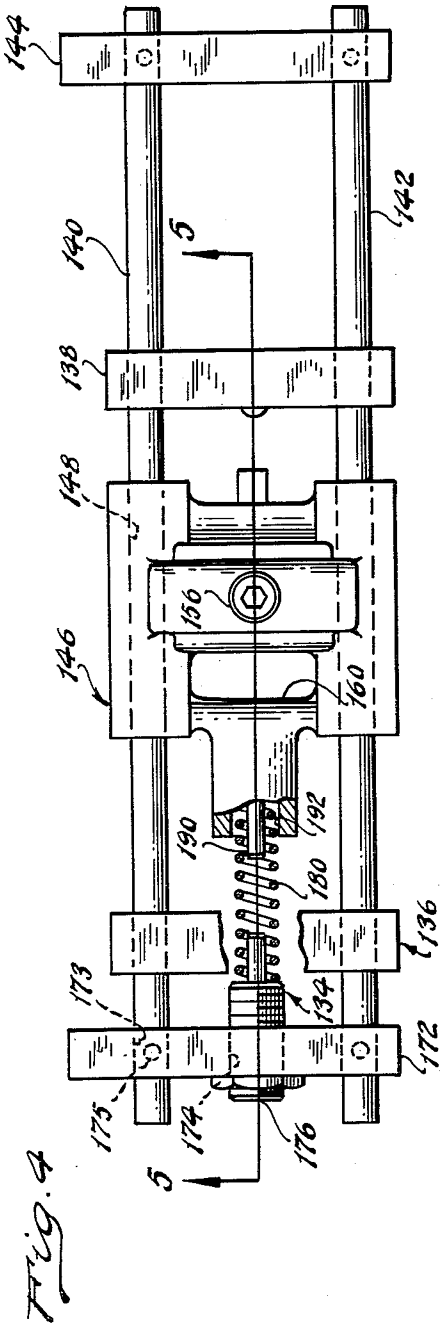
FIGURE 4 is a broken away partial view of the tape feeding mechanism illustrated in FIGURE 3 taken in direction 4—4 in FIGURE 3.
Figures 5, 6:
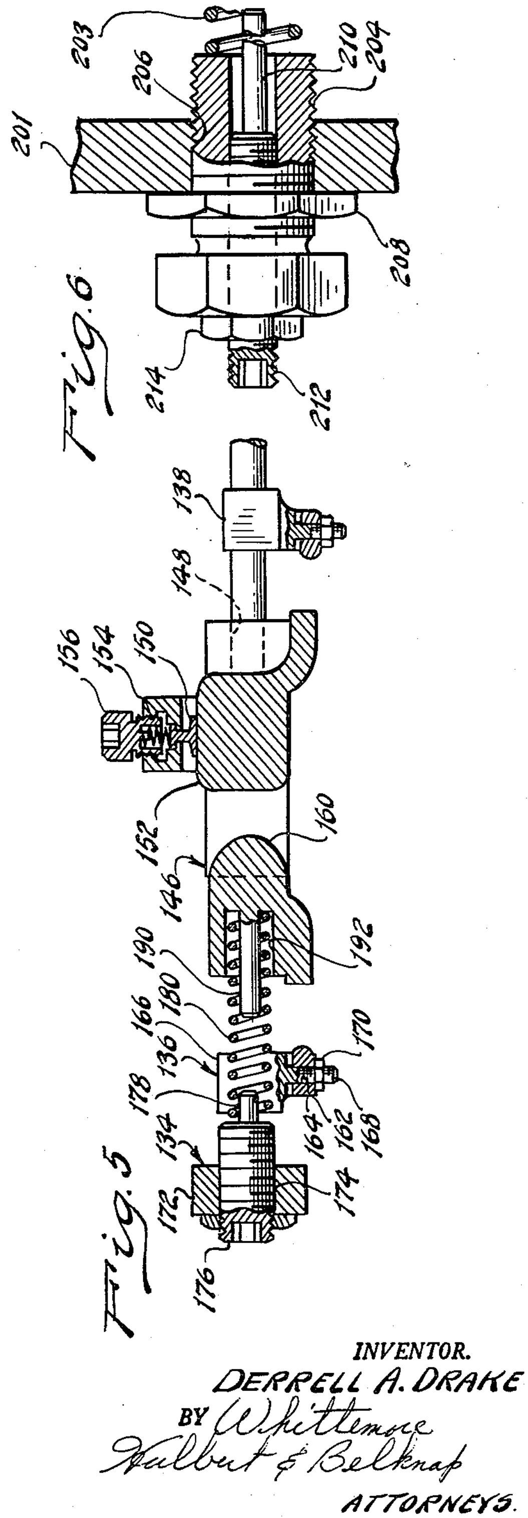
FIGURE 5 is a partial longitudinal section of the portion of the tape feeding mechanism of FIGURE 3 shown in FIGURE 4 taken on the line 5—5 in FIGURE 4.
FIGURE 6 is a partial sectional view of modified stop and biasing means for use with the tape feeding mechanism illustrated in FIGURES 3–5.

A modification of the reindexing mechanism of the invention is shown in FIGURES 3–5. As indicated in FIGURE 3 the modified reindexing mechanism generally indicated 130 comprises guide means 132, bias means 134 and adjustable abutments 136 and 138. Guide means 132 comprises a pair of spaced parallel rods 140 and 142 rigidly supported in fixed support 144 and slide 146 shaped as shown having passages 148 therethrough whereby the slide 146 is mounted for sliding movement along the rods 140 and 142.

Guide means 142 further includes a tension bar 150 mounted in slide 146 as shown best in FIGURE 5. Tension bar 150 is resiliently urged into contact with the surface 152 of the slide 146 by means of spring 154 adjustably secured in slide 146 by means of screw 156. It will be understood that on passage of the tape 158 as shown between the tension bar 150 and the surface 152 and subsequently downward through the opening 160 in the slide 146 as shown in FIGURE 3, the tension bar 150 will urge the tape into contact with the surface 152 in the manner in which the shoe 56 urges the tape 34 into contact with the guide member 54 as shown in FIGURE 1.

The adjustable stops 136 and 138 of reindexing mechanism 130 are located at opposite ends of slide 146. Each of the adjustable stops are constructed of a bottom member 162 having passages 164 therethrough and a top member 166 having studs 168 depending therefrom adapted to extend through the passages 164 whereby the abutments 136 and 138 may be adjustably secured in position along the rods 140 and 142 by means of nuts 170 as will be understood.

A cross member 172 is provided at the left end of the rods 140 and 142 as shown in FIGURE 4. The cross bar 172 may be secured to the rods 140 in any convenient manner such as passages 173 and set screws 175. Cross member 172 has a passage 174 therethrough through which the threaded screw 176 extends. As indicated best in FIGURE 5 the screw 176 has projection 178 on the end thereof over which spring 180 is sleeved at one end. The other end of spring 180 as shown is sleeved over a centrally located projection 190 within a recess 192 in slide 146.

Thus in operation the tape 158 urged against the surface 152 of the slide 146 by tension bar 150 will cause the slide 146 to be moved in opposition to the bias of spring 180 into contact with abutment 136 while the tape 158 is driven in the direction of arrow 194 by means of the punch rollers 196 and 198 and the pinch roller mechanism 200 during reception of signals representative of characters to be punched in the tape by the actuating means of the punch rollers. It will be understood that punch rollers 196 and 198 and pinch roller mechanism 200 are similar to punch rollers 14 and 16 and pinch roller mechanism 18 illustrated in FIGURE 1. On the stopping of such signals the tape will be moved in the direction of arrow 194 due to the inertia of punch rollers 196 and time required to remove the punches from the tape a distance sufficient to cause the spacing between characters on the tape to be undesirable.

The reindexing mechanism 130 however will move the tape 158 in a direction opposite to arrow 194 to correctly position the tape so that the spacing between the last character of one group and the first character of the next group will be correctly spaced when punching of the tape is resumed due to the movement of the slide 146 into contact with the abutment 148 since the bias of the spring 180 is sufficient to overcome the driving force of the pinch roller mechanism 200 as before.

Again the amount of reindexing by the reindexing mechanism 130 is adjustable by means of positioning the stops 136 and 138. Further the screws 202, 156 and 176 are provided to adjust the biases applied to the pinch rollers, the tension bar and the slide to provide the above indicated operation as before.

FIGURE 6 illustrates a combined adjustable stop and adjustable bias means for use in conjunction with the slide 146. The fixed cross member 201 illustrated in FIGURE 6 and the bias spring 203 may be similar to cross bar 172 and spring 180 as shown in FIGURE 4. The bias exerted by spring 203 is adjustable by means of the stud 204 threaded in passage 206 through the fixed cross member 201. The stud 204 may be locked in adjusted position by means of nut 208. The forward abutment for the slide 146 is provided by means of the cylindrical extension 210 on adjustable screw 212. The screw 212 may be locked in adjusted position by means of lock nut 214. Thus it will be seen that the construction of FIGURE 6 will replace the separate abutment 136 and biasing means 134 illustrated in FIGURE 4.

The drawings and the foregoing specification constitute a description of the improved tape feeding mechanism in such full, clear, concise and exact terms as to enable any person skilled in the art to practice the invention, the scope of which is indicated by the appended claims.

What I claim as my invention is:

1. Tape feeding mechanism comprising drive means operable to draw tape to be perforated with axially spaced groups of perforations representing groups of coded characters through tape perforating means, including tape driving punch rollers and tape driving pinch rollers, a pair of stops, tape guide means, means urging tape to be perforated into frictional contact with said guide means, means mounting said guide means for movement by the tape into engagement with one of said stops during driving of both said punch and pinch rollers, and means biasing said guide means into contact with the other of said stops when said punch rollers are not being driven whereby the tape frictionally held by said guide is reindexed on stopping of the punch rollers to provide a predetermined spacing between the perforations representing the last character of one group of characters and the perforations representing the first character of the next group of characters.

2. Tape feeding mechanism comprising drive means operable to draw tape to be perforated with axially spaced transverse rows of perforations representing groups of coded characters through tape perforating means, and reindexing means including a pair of stops, tape guide means, said guide means frictionally engaging the tape to be perforated, means mounting said guide means for movement by the tape into engagement with one of said stops on operation of said drive means, and bias mechanism operably associated with said guide means to urge said guide means against the other of said stops when said drive means is not operable to draw the tape through the perforating means, whereby said reindexing means is operable on stopping of the drive means to position the tape to provide a predetermined spacing between the perforations representing the last character of one group of characters and the perforations representing the first character of the next group of characters.

3. Structure as set forth in claim 2 wherein said guide means comprises a lever pivotally mounted for movement between said stops, a guide member carried by said lever, and shoe means for urging the tape against said guide member.

4. Structure as set forth in claim 3 wherein said shoe means comprises a shoe member resiliently and adjustably supported on said lever to provide a variable biasing force for urging the tape against said guide member.

5. Structure as set forth in claim 2 wherein said stops comprise screws adjustably mounted in fixed supporting members at opposite sides of said lever to restrict pivotal movement thereof and thereby determine the amount of reindexing provided by said reindexing means.

6. Structure as set forth in claim 2 wherein said bias mechanism comprises a bolt pivotally secured to said lever, a pivotally mounted bracket having a passage therethrough, said bolt extending through said passage, abutment means secured to the end of said bolt, and resilient means acting between said abutment means and said bracket urging said bolt through said passage.

7. Structure as set forth in claim 6 wherein said abutment means is adjustable axially of said bolt to vary the force urging said bolt through said passage.

8. Structure as set forth in claim 2 wherein said guide means comprises a pair of rods, a slide mount on said rods for sliding movement between said stops, said slide having a guide surface thereon, and tension bar means for urging the tape against said guide surface.

9. Structure as set forth in claim 8 wherein said tension bar means comprises a tension bar resiliently and adjustably supported in said slide to provide a variable biasing force for urging said tape into contact with said guide surface.

10. Structure as set forth in claim 8 wherein said stops comprise cross bars extending between said rods adjacent opposite ends of said slide, each of said cross bars being adjustably positionable along said rods and means for securing said cross bars in adjusted positions thereof.

11. Structure as set forth in claim 8 wherein said bias mechanism comprises a cross member extending between said rods at one end of said slide, adjusting means extending through said cross member axially of said rods and resilient means acting between said slide and adjusting means.

12. Structure as set forth in claim 8 wherein said bias mechanism comprises a cross member extending between said rods at one end of said slide, an adjustable abutment extending through said cross member axially of said rods and resilient means acting between said slide and abutment and wherein one of said stops comprises a shaft extending axially of said rods and threadedly received for adjustment in said abutment.

13. Structure as set forth in claim 2 wherein said bias mechanism and one of said stops are one assembly.

14. Tape feeding mechanism comprising drive means operable to draw a non-uniform length of tape to be perforated with axially spaced groups of perforations representing groups of coded characters through tape perforating means including tape driving punch rollers and tape driving pinch rollers, a pair of stops, tape guide means, means urging tape to be perforated into frictional contact with said guide means, means mounting said guide means for movement by the tape into engagement with one of said stops during driving of both said punch and pinch rollers, and means biasing said guide means into contact with the other of said stops when said punch rollers are not being driven after drawing any length of tape through the tape perforating means whereby the tape frictionally held by said guide is reindexed on stopping of the punch rollers to provide a predetermined spacing between the perforations representing the last character of one group of characters and the perforations representing the first character of the next group of characters.

15. Tape feeding mechanism comprising drive means operable to draw a non-uniform length of tape to be perforated with axially spaced transverse rows of perforations representing groups of coded characters through tape perforating means, and reindexing means operable on stopping of the drive means after drawing any length of tape through the tape perforating means to position the tape to provide a predetermined spacing between the perforations representing the last character of one group of characters and the perforations representing the first character of the next group of characters, including a pair of stops, tape guide means, said guide means frictionally engaging the tape to be perforated, means mounting said guide means for movement by the tape into engagement with one of said stops on operation of said drive means, and bias mechanism operably associated with said guide means to urge said guide means against the other of said stops when said drive means is not operable to draw the tape through the perforating means.

16. Tape feeding mechanism comprising driving means operable to drawn a non-uniform length of tape to be perforated with axially spaced transverse rows of perforations representing groups of coded characters through tape perforating means, and reindexing means operable on stopping of the drive means after drawing any length of tape through the tape perforating means to position the tape to provide a predetermined spacing between the perforations representing the last character of one group of characters and the perforations representing the first character of the next group of characters, including tape guide means frictionally engaging the tape to be perforated, means mounting said guide means for limited movement in one direction on operation of said drive means, and bias mechanism associated with said guide means for urging said guide means in the opposite direction when the drive means is not operable to draw the tape through the perforating means.

References Cited in the file of this patent

UNITED STATES PATENTS

| | | |
|---|---|---|
| 1,995,030 | Hopkins et al. | Mar. 19, 1935 |
| 2,824,736 | Allen | Feb. 25, 1958 |
| 2,946,381 | Lisinski | July 26, 1960 |

FOREIGN PATENTS

| | | |
|---|---|---|
| 220,805 | Great Britain | Aug. 28, 1924 |
| 799,596 | Great Britain | Aug. 13, 1958 |